(12) United States Patent
Kantor et al.

(10) Patent No.: US 11,212,308 B1
(45) Date of Patent: Dec. 28, 2021

(54) METHODS AND SYSTEMS FOR IDENTIFYING AND CLASSIFYING LOCATIONS OF NETWORKED DEVICES

(71) Applicant: CYBERTOKA Ltd., Tel Aviv (IL)

(72) Inventors: Alon Kantor, Tel Aviv (IL); Moty Zaltzman, Sde Warburg (IL); Sofia Belikovetsky, Ra'anana (IL); Reut Roich, Tel Aviv (IL)

(73) Assignee: CYBERTOKA LTD., Tel Aviv (IL)

( * ) Notice: Subject to any disclaimer, the term of this patent is extended or adjusted under 35 U.S.C. 154(b) by 0 days.

(21) Appl. No.: 17/139,019

(22) Filed: Dec. 31, 2020

(51) Int. Cl.
*H04L 29/06* (2006.01)
*H04W 4/02* (2018.01)
(Continued)

(52) U.S. Cl.
CPC ........ *H04L 63/1425* (2013.01); *H04L 43/106* (2013.01); *H04L 61/2015* (2013.01);
(Continued)

(58) Field of Classification Search
CPC ... H04L 47/826; H04L 67/142; H04L 67/146; H04L 67/26; H04L 67/42; H04L 67/1097; H04L 67/141; H04L 67/14; H04L 67/10; H04L 63/1425; H04L 51/20; H04L 63/1416; H04L 63/1441; H04L 51/32; H04L 63/101; H04L 63/0876; H04L 63/20; H04L 63/10; H04L 43/04; H04L 61/2007; H04L 63/0236; H04L 63/0272; H04L 41/22; H04L 63/107; H04L 63/1433; H04L 41/069; H04L 41/0853; H04L 63/1483; H04L 67/22; H04L 29/06047; H04L 41/0631; H04L 41/065; H04L 41/082; H04L 41/0893; H04L 41/145; H04L 43/02; H04L 43/06; H04L 43/065; H04L 43/0876; H04L 67/02; H04L 67/2804; H04L 67/303; H04L 69/02; H04L 69/40; H04L 41/0803; H04L 49/351; H04L 63/0884;
(Continued)

(56) References Cited

U.S. PATENT DOCUMENTS

| | | | | |
|---|---|---|---|---|
| 8,190,120 | B1* | 5/2012 | Rieschick | H04M 15/81 455/405 |
| 2003/0097589 | A1* | 5/2003 | Syvanne | H04L 63/107 726/11 |

(Continued)

*Primary Examiner* — Djenane M Bayard
(74) *Attorney, Agent, or Firm* — Mark M. Friedman (57) ABSTRACT

Computerized methods and systems locate a first device connected to a first network. One or more logs, each generated at a corresponding second device connected to the first network, are received via a second network linked to the first network. Each log has network data having network information associated with the corresponding second device, and location data having location information indicative of a location of the corresponding second device. The network data is analyzed to identify network information in at least one log that matches received network information associated with the first device. Location information in the location data of the at least one log is used to determine a location associated with the first device. In some implementations, the network data in the at least one log and timestamps associated with the network data in the at least one log are used in order to classify the determined location.

21 Claims, 5 Drawing Sheets

(51) Int. Cl.
*H04L 12/26* (2006.01)
*H04W 4/80* (2018.01)
*H04L 29/12* (2006.01)

(52) U.S. Cl.
CPC .......... *H04L 63/0807* (2013.01); *H04W 4/02* (2013.01); *H04W 4/80* (2018.02)

(58) Field of Classification Search
CPC . H04L 63/108; H04L 63/145; H04L 63/1466; H04L 12/189; H04L 12/1895; H04L 1/20; H04L 25/0216; H04L 27/2665; H04L 27/2688; H04L 27/2695; H04L 29/1216; H04L 29/12301; H04L 29/12783; H04L 41/00; H04L 41/0213; H04L 41/0253; H04L 41/0846; H04L 41/28; H04L 51/00; H04L 51/38; H04L 61/1529; H04L 61/157; H04L 61/2076; H04L 61/35; H04L 63/1408; H04L 67/04; H04L 67/125; H04L 67/24; H04L 67/2833; H04L 67/306; H04L 69/329; G06F 9/452; G06F 9/45558; G06F 2009/45595; G06F 9/5077; G06F 9/468; G06F 21/556; G06F 3/0482; G06F 11/3006; G06F 11/3072; G06F 11/3433; G06F 11/3452; G06F 13/102; G06F 16/217; G06F 21/554; G06F 2201/86

See application file for complete search history.

(56) References Cited

U.S. PATENT DOCUMENTS

| | | | |
|---|---|---|---|
| 2006/0129691 A1* | 6/2006 | Coffee | H04L 67/04 709/230 |
| 2006/0149844 A1* | 7/2006 | Droz | H04L 61/2076 709/227 |
| 2016/0066136 A1* | 3/2016 | MacNair | G06Q 20/405 455/456.1 |
| 2018/0191848 A1* | 7/2018 | Bhattacharya | H04W 12/63 |

* cited by examiner

METHODS AND SYSTEMS FOR IDENTIFYING AND CLASSIFYING LOCATIONS OF NETWORKED DEVICES

TECHNICAL FIELD

The present invention relates to locating networked devices.

BACKGROUND OF THE INVENTION

The rapid development of Information Technology (IT) in general and the Internet of Things (IoT) in particular have led to the deployment of an increasing number of network-connected electronic devices. These networked devices are often connected to the public Internet but can also be connected to other private or public networks. The networked devices can take various forms, including, for example, mobile devices, desktop computers, laptop computers, routers, switches, home entertainment systems, digital video recorders (DVRs), network video recorders (NVRs), transportation systems, home appliances, medical equipment, manufacturing systems, and smart meter.

Each one of these networked devices is normally associated with one or more addresses, such as, for example, internet protocol (IP) addresses (e.g., IPv4, IPv6) and media access control (MAC) addresses. The association of these addresses with the networked device can be achieved in various ways, and one or more of the addresses associated with the networked device may change over time. In certain cases, the association is static, in that a certain address is manually or automatically assigned to the networked device. In other cases, the association is dynamic, in which various protocols, such as dynamic host configuration protocol (DHCP), can be used to dynamically assign and associate an address with a device. In addition, an address could be associated with a device through the use of Network Address Translation (NAT), where a device might use one address as a source address when it transmits a packet, but as the packet traverses various network elements such as routers, switches, bridges or firewalls along its path, the source address could be changed. In such a case, the networked device could be considered to be associated with each of the source addresses used along the path. Similarly, association could occur through the use of various network protocols that use packet encapsulation, such as generic routing encapsulation (GRE), virtual extensible LAN (VXLAN), or IP security (IPsec). Packet encapsulation can add an external IP header to a packet transmitted by a network device thus causing the network device to be associated with the source address of the external IP header.

SUMMARY OF THE INVENTION

The present invention is directed to computerized systems and methods for identifying and classifying the location of a target electronic device connected to a network.

Embodiments of the present invention are directed to a method for locating a first electronic device connected to a first network. The method comprises: receiving, via a second network linked to the first network, one or more logs, each log generated at a corresponding second electronic device connected to the first network and each log having: i) network data that includes network information associated with the corresponding second electronic device, and ii) location data that includes location information indicative of a location of the corresponding second electronic device; analyzing the network data of the received one or more logs to identify network information in at least one log that matches received network information associated with the first electronic device; and determining a location associated with the first electronic device based on the location information in the location data of the at least one log.

Optionally, for each log: the network data and the location data are contained in a single log file.

Optionally, for each log: the network data is contained in one or more first log files, and the location data is contained in one or more second log files separate from the one or more first log files.

Optionally, the receiving the one or more logs includes: storing the one or more logs at a server connected to the second network, and receiving the stored one or more logs at a correlation engine in data communication with the server.

Optionally, the first network is a local area network, and the second network is a wide area network.

Optionally, the first network is linked to the second network via a network element that provides a connection between the first and second networks, and for each of the one or more logs, the network information includes at least one of: an internet protocol (IP) address of the network element allocated from the first network, or an IP address of the network element allocated from the second network.

Optionally, the network element is selected from the group consisting of: a router, a firewall, and a gateway.

Optionally, for each of the one or more logs, the network information includes at least one of: an internet protocol (IP) address of the corresponding second electronic device allocated by the first network, or an IP address allocated by the second network that is associated with the corresponding second electronic device.

Optionally, for each of the one or more logs, the network information includes at least one of: one or more addresses associated with the corresponding second electronic device, media access control addresses of electronic devices connected to the first network, classless inter-domain routing addresses of the first network, a Service Set Identifier of the first network, or a Bluetooth master device name.

Optionally, the received network information associated with the first electronic device includes at least one of: one or more addresses associated with the first electronic device, an internet protocol address of the first electronic device, a media access control address of the first electronic device, a Service Set Identifier of a network to which the first electronic device is connected, a Bluetooth master device name of a network in which the first electronic device is a member.

Optionally, for each of the one or more logs, the network data has one or more associated timestamps.

Optionally, the method further comprises: receiving a time interval associated with the network information associated with the first electronic device, and the analyzing the network data includes: inspecting the network data of the received one or more logs to identify network information that: i) matches the received network information associated with the first electronic device, and ii) in which at least one of the one or more timestamps, associated with the network data having the matching network information, falls within the time interval.

Optionally, the method further comprises: analyzing the network data in the at least one log and the timestamps associated with the network data in the at least one log to classify the determined location according to a location type.

Optionally, the analyzing the network data in the at least one log and the timestamps associated with the network data in the at least one log includes detecting a pattern based on at least one of: i) a number of unique second electronic devices associated with the at least one log, ii) a duration of stay of each of the unique second electronic devices associated with the at least one log, iii) a time of day at which each of the at least one log was generated, iv) a correlation between a time of arrival of second electronic devices to one or more locations indicated by the location information in the location data of the at least one log, or v) a correlation between a time of departure of second electronic devices from one or more locations indicated by the location information in the location data of the at least one log.

Optionally, the location type is selected from the group consisting of: a public transportation station, a shop, a private residence, an educational facility, and a medical facility.

Optionally, for each of the one or more logs, the location data is provided by at least one electronic component of the corresponding second electronic device.

Optionally, the at least one electronic component includes one or more of: a global positioning system receiver, an accelerometer, a wireless network transceiver, a short-range wireless network transceiver, an imaging device, or a cellular network transceiver.

Optionally, for each of the one or more logs, the location data includes one or more of: data provided by a global positioning system receiver of the second electronic device, positioning data provided by one or more accelerometers of the second electronic device, one or more Service Set Identifiers of a wireless network detected by a wireless network transceiver of the second electronic device, one or more Bluetooth device names detected by a Bluetooth communication transceiver of the second electronic device, a list of media access control or internet protocol addresses in communication data received by a Bluetooth transceiver of the second electronic device, image data captured by an imaging device associated with the second electronic device, cellular base transceiver stations and associated signal strength provided by a cellular network transceiver of the second electronic device.

Optionally, the method further comprises: generating, by a reporter module installed on one or more second electronic devices connected to the first network, the one or more logs; and sending, by the reporter module of each of the one or more second electronic devices, the generated log to a server connected to the second network.

Embodiments of the present invention are directed to a system for locating a first electronic device connected to a first network. The system comprises: a server linked to the first network via a second network and configured to receive, via the second network, one or more logs, each log generated at a corresponding second electronic device connected to the first network and each log having: i) network data that includes network information associated with the corresponding second electronic device, and ii) location data that includes location information indicative of a location of the corresponding second electronic device; and a correlation engine including at least one processor in data communication with the server and configured to: analyze the network data of the one or more logs received by the server to identify network information in at least one log that matches received network information associated with the first electronic device, and determine a location associated with the first electronic device based on the location information in the location data of the at least one log.

Optionally, for each log: the network data and the location data are contained in a single log file.

Optionally, for each log: the network data is contained in one or more first log files, and the location data is contained in one or more second log files separate from the one or more first log files.

Optionally, the first network is a local area network, and the second network is a wide area network.

Optionally, a connection between the first and second networks is provided by a network element, and for each of the one or more logs, the network information includes at least one of: an internet protocol (IP) address of the network element allocated from the first network, or an IP address of the network element allocated from the second network.

Optionally, the network element is selected from the group consisting of: a router, a firewall, and a gateway.

Optionally, for each of the one or more logs, the network information includes at least one of: an internet protocol (IP) address of the corresponding second electronic device allocated by the first network, or an IP address allocated by the second network that is associated with the corresponding second electronic device.

Optionally, for each of the one or more logs, the network information includes at least one of: one or more addresses associated with the corresponding second electronic device, media access control addresses of electronic devices connected to the first network, classless inter-domain routing addresses of the first network, a Service Set Identifier of the first network, or a Bluetooth master device name.

Optionally, the received network information associated with the first electronic device includes at least one of: one or more addresses associated with the first electronic device, an internet protocol address of the first electronic device, a media access control address of the first electronic device, a Service Set Identifier of a network to which the first electronic device is connected, a Bluetooth master device name of a network in which the first electronic device is a member.

Optionally, for each of the one or more logs, the network data has one or more associated timestamps, and the correlation engine is further configured to: analyze the network data in the at least one log and the timestamps associated with the network data in the at least one log to detect patterns in the network data in the at least one log and the timestamps associated with the network data in the at least one log so as to classify the determined location according to a location type.

Optionally, the patterns are detected based on at least one of: i) a number of unique second electronic devices associated with the at least one log, ii) a duration of stay of each of the unique second electronic devices associated with the at least one log, iii) a time of day at which each of the at least one log was generated, iv) a correlation between a time of arrival of second electronic devices to one or more locations indicated by the location information in the location data of the at least one log, or v) a correlation between a time of departure of second electronic devices from one or more locations indicated by the location information in the location data of the at least one log.

Optionally, the location type is selected from the group consisting of: a public transportation station, a shop, a private residence, an educational facility, and a medical facility.

Optionally, for each of the one or more logs, the location data is provided by at least one electronic component of the corresponding second electronic device.

Optionally, the at least one electronic component includes one or more of: a global positioning system receiver, an accelerometer, a wireless network transceiver, a short-range wireless network transceiver, an imaging device, or a cellular network transceiver.

Optionally, for each of the one or more logs, the location data includes one or more of: data provided by a global positioning system receiver of the second electronic device, positioning data provided by one or more accelerometers of the second electronic device, one or more Service Set Identifiers of a wireless network detected by a wireless network transceiver of the second electronic device, one or more Bluetooth device names detected by a Bluetooth communication transceiver of the second electronic device, a list of media access control or internet protocol addresses in communication data received by a Bluetooth transceiver of the second electronic device, image data captured by an imaging device associated with the second electronic device, cellular base transceiver stations and associated signal strength provided by a cellular network transceiver of the second electronic device.

Optionally, the system further comprises: a reporter module installed on one or more second mobile devices connected to the first network configured to generate the one or more logs.

Embodiments of the present invention are directed to a method for locating a first electronic device connected to a first network. The method comprises: receiving, via a second network linked to the first network, one or more sets of log records, each set generated at a corresponding second electronic device connected to the first network, and each set having: i) at least one network log record containing network data associated with the corresponding second electronic device, and ii) at least one location log record associated with the at least one network log record and containing location data indicative of a location of the corresponding second electronic device; analyzing the received log records to identify network data in at least one of the log records that matches received network data associated with the first electronic device; and determining a location associated with the first electronic device based on the location data in location log records associated with the at least one of the log records.

This document references terms that are used consistently or interchangeably herein. These terms, including variations thereof, are as follows:

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smart phone, personal digital assistant (PDA), mobile telephone or cellular telephone).

A "server" is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software-based emulation of a computer.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DESCRIPTION OF THE PREFERRED EMBODIMENTS

The present invention is directed to computerized systems and methods for identifying and classifying the location of a target electronic device connected to a first network, preferably a local area network (LAN). The system generally includes a log server and a correlation engine connected to a second network, preferably a wide area network (WAN), that is linked to the LAN via network device (e.g., a router). The log server receives logs that are generated by one or more additional electronic devices connected to the LAN. In a preferred embodiment, each log includes multiple log records (i.e., data entries), some of which contain network-related information, e.g., addresses associated with the additional electronic device, and/or wireless devices to which the additional electronic devices are connected, etc, and some of which contain location-related information. In preferred embodiments, each additional electronic device has a reporter module that can be installed thereon to generate the logs. The location-related information in the generated log is preferably gleaned from one or more components of the additional electronic device, such as, for example, wireless or cellular transceivers, GPS receivers, accelerometers, and the like. The correlation engine receives input associated with the target electronic device and scans the logs received from the log server to identify log records that match the input. The location-related information in log records associated with the identified log records is used by the correlation engine to determine the location of the target device. In preferred embodiments, the correlation engine additionally uses the identified log records to classify the location according to location type.

The embodiments described herein are applicable to various networking environments in which passive location determination of one or more networked devices is to be performed, including situations in which direct access to the location of such a networked device is not available, or in which it is undesirable to directly request that such a networked device provide its location to another network element.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Figure 1:
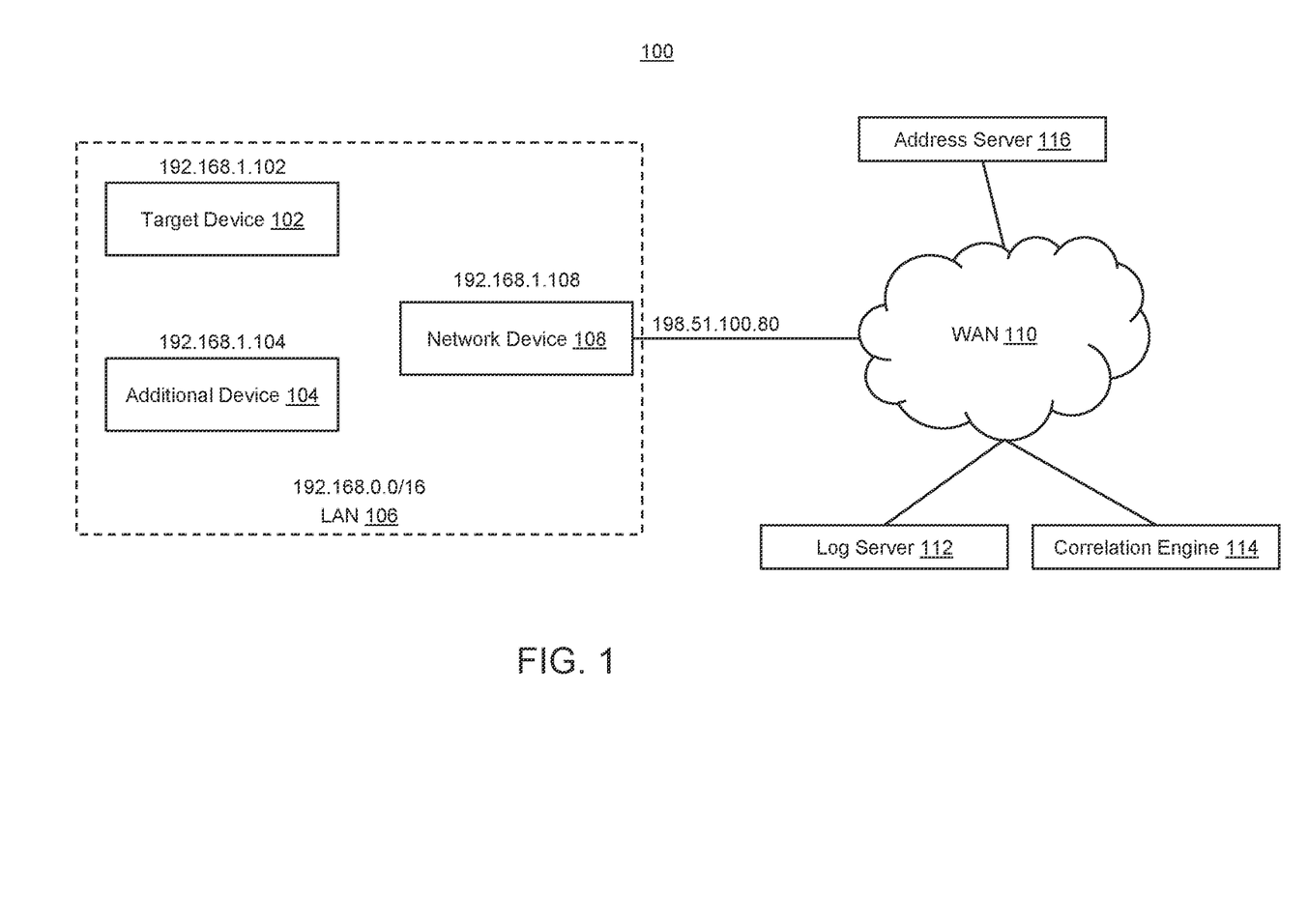
FIG. 1 is a diagram illustrating an example system environment in which an embodiment of the invention is deployed having a target electronic device and at least one additional electronic device connected to a first network in the form of a local area network.

Refer now to FIG. 1, an illustrative example system environment 100 in which embodiments of the present disclosure may be performed. Generally speaking, the environment 100 contains a target electronic device 102 (referred to hereinafter interchangeably as "target device", "first electronic device" or "first device") whose location and/or location classification is to be determined. The target device 102 may be any network connectable device, including, but not limited to a mobile communication device (e.g., smartphone, tablet, etc.), a desktop computer, a laptop computer, a router, a network bridge, a network switch, a home entertainment system, a DVR, an NVR, a transportation system, a home appliance, a medical equipment, a manufacturing system, or a smart meter, or any other type of network connectable device that falls within the definition of a "computer" as defined above.

The target device 102 is connected to a first network 106, illustrated in the present non-limiting implementation as a local area network (LAN) 106, via a wired or wireless connection. The LAN 106 may include one or more sub-networks (subnets) and is associated with an address allocation and routing method which allocates IP addresses to devices connected to the LAN 106. In the illustrated embodiment, the LAN 106 uses a Classless Inter-Domain Routing (CIDR) block for routing and to allocate addresses belonging to, for example, 192.168.0.0/16, to devices connected to the LAN 106. Accordingly, in FIG. 1, the target device 102 is configured with an IP address, such as 192.168.1.102, that belongs to the CIDR block of the LAN 106.

A network element 108 provides a connection between the LAN 106 and a second network 110 separate from the LAN 106. In the illustrated embodiment, the second network 110 is a wide area network (WAN) 110, such as, for example, the Internet. The network element 108 is configured with an IP address belonging to the LAN 106 (i.e., allocated by the CIDR block), such as 192.168.1.108, as well as an address associated with the WAN 110, such as 198.51.100.80. The network element 108 is configured to forward traffic between the LAN 106 and the WAN 110, for example, the network element 108 can forward packets received, via the LAN 106, from the target device 102, to the WAN 110, and can forward packets received from the WAN 110 to a device connected to the LAN 106.

The network element 108 can be implemented as any network device that sits between two different networks (so as to have IP addresses associated with both of the networks) and that forwards traffic between the two networks. Such network devices include, for example, routers, firewalls, and gateways. Without loss of generality, the network element 108 will be referred to interchangeably as a "router" throughout the remaining portions of the present disclosure. However, it should be understood that the term "router" encompasses the various types of network devices that have IP addresses associated with two different networks and that forward traffic between the two networks. The components of a non-limiting example of a router 108 will be described in subsequent sections of the present disclosure with reference to FIG. 6.

The router 108 is preferably configured to perform network address translation (NAT), such that the source address of packets originating from the LAN 106 and forwarded to the WAN 110 is translated by the router 108 to its own WAN address (e.g., 198.51.1.80) or to some other WAN address, and the destination addresses of returning packets (i.e., from the WAN 110 to the LAN 106) are translated from the WAN address to the LAN address. The router 108 could also be configured to use other network protocols that use packet encapsulation such as GRE, VXLAN, or IPsec, which could encapsulate packets from the LAN 106 as they are forwarded to the WAN 110. Accordingly, when the router 108 forwards packets originating from the target device 102 within the LAN 106, the target device 102 becomes associated with an IP address of the WAN 110 (e.g., 198.51.100.80) as well as an IP address of the LAN 106 (e.g., 192.168.1.102).

An additional electronic device 104 (referred to hereinafter interchangeably as "additional device", "second electronic device" or "second device") is also shown as being connected to the LAN 106. The additional device 104 is generally any network connectable device that can be connected to the LAN 106, including the example devices listed for the target device 102. The connection of the additional device 104 to the LAN 106 can be a wired or wireless connection, and can be ephemeral or more permanent in nature. It should be appreciated that the operation of the LAN 106, router 108 and WAN 110 with respect to packets originating from or destined to the additional device 104 is generally similar to as described above with respect to the target device 102. In particular, the router 108 is configured to forward traffic (e.g., packets) which originates from or is destined to the additional device 104 between the LAN 106 and the WAN 110. As such, the target device 102 is configured with an IP address, such as 192.168.1.104, that belongs to the CIDR block of the LAN 106. It should further be appreciated that when such traffic is forwarded, NAT or network encapsulation protocols (as described above) are preferably employed by the router 108 which would result in the same IP address of WAN 110 (e.g., 198.51.100.80) that is associated with the target device 102 to also be associated with the additional device 104.

The additional device 104, although illustrated in FIG. 1 as a single device, is in many cases representative of a plurality of devices, each being similar in structure and operation to the additional device 104.

Figure 2:
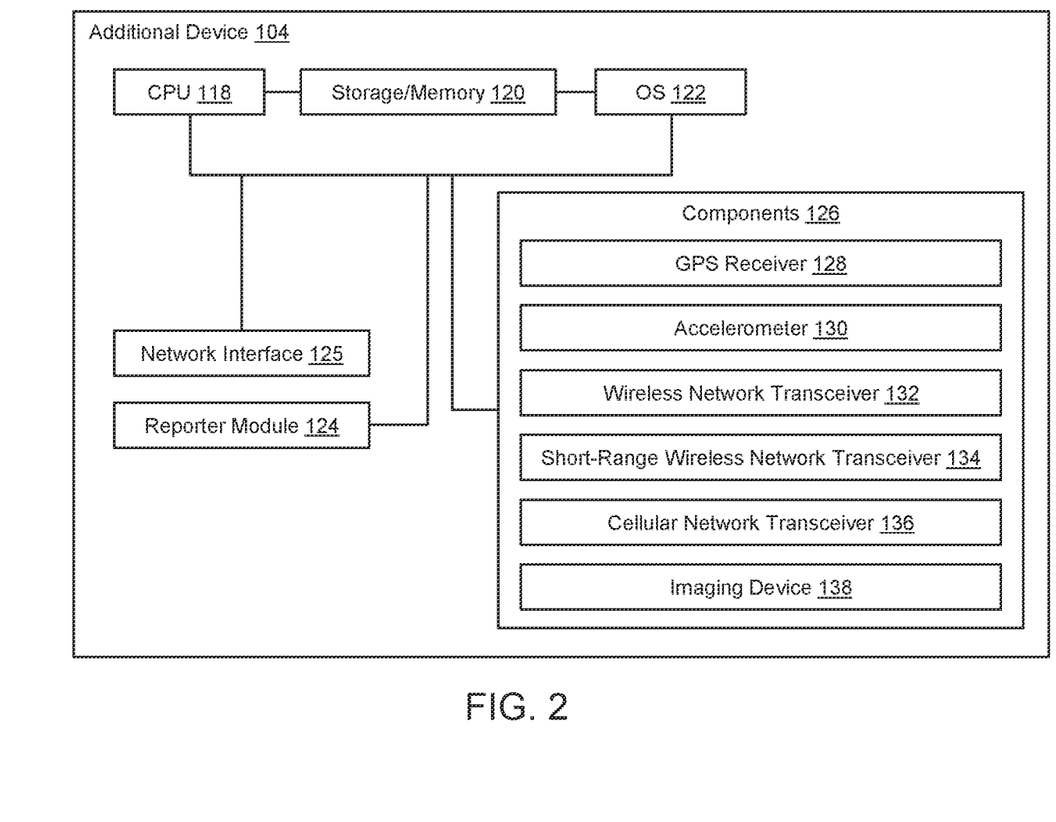
FIG. 2 is a diagram of the architecture of an exemplary additional electronic device.

Referring now to FIG. 2, there is shown a block diagram of an exemplary additional device 104 according to certain embodiments of the present disclosure. Initially, the additional device 104 includes a central processing unit (CPU) 118, a storage/memory 120, an operating system (OS) 122, and a network interface 125. The additional device 104 also includes a reporter module 124 and components 126 (some of which are sensors). All components of the additional device 104 are connected or linked to each other (electronically and/or data), either directly or indirectly.

The CPU 118 is formed of one or more processors, including microprocessors, for performing the functions of the additional device 104, including executing the functionalities and operations of the reporter module 124, as detailed herein, as well as the components 126 and the OS 122. The processors are, for example, conventional processors, such as those used in servers, computers, and other computerized devices. For example, the processors may include x86 Processors from AMD and Intel, Xeon® and Pentium® processors from Intel, as well as any combinations thereof.

The storage/memory 120 is any conventional storage media, which although shown as a single component for representative purposes, may be multiple components. The storage/memory 120 stores machine executable instructions, associated with the operation of the reporter module 124 and the components 126, for execution by the CPU 118. The storage/memory 120 may also store data associated with one or more of the components 126.

The OS 122 includes any of the conventional computer operating systems, such as those available from Microsoft of Redmond Wash., commercially available as Windows® OS, such as Windows® 10, Windows® 7, Apple of Cupertino, Calif., commercially available as MAC OS, or iOS, open-source software based operating systems, such as Android, and the like.

The network interface 125 is a physical, virtual, or logical data link for communication (e.g., exchanging data) with the LAN 106 as well as the router 108 and the WAN 110. For example, packets from the WAN 110 that are destined for the additional device 104 are received at the network interface 125 (via the router 108), and packets from the additional device 104 destined for the WAN 110 are sent by the network interface 125 to the router 108 which forwards the packets to the WAN 110.

The components 126, in addition to performing primary functions associated with the additional device 104, are also used to collect information indicative of the location of the additional device 104. This "location information" or "location-related information", is used as a basis for determining the location of the target device 102, as will be discussed.

The components 126 can include one or more of the following: a global positioning system (GPS) receiver 128, an accelerometer 130 (or multiple accelerometers), a wireless network transceiver 132, a short-range wireless network transceiver 134, a cellular network transceiver 136 (i.e., a modem for receiving and transmitting data over a cellular network, such as, for example, a 3G, 4G, 4G LTE, or 5G cellular network), and an imaging device 138 (i.e., a camera) for capturing images of a scene.

The wireless network transceiver 132 may be any transceiver (i.e., modem) for exchanging data with a wireless access point provided by a wireless LAN. In embodiments in which the LAN 106 is a wireless LAN that operates on wireless network protocols based on the IEEE 802.11 family of standards (commonly referred to as "Wi-Fi"), the wireless network transceiver 132 is configured to exchange data with the router 108 using such aforementioned network protocols.

The short-range wireless network transceiver 134 may be any transceiver used for exchanging data between the additional device 104 and another device over short distances. In embodiments in which the LAN 106 is an ad hoc network (e.g., a piconet) using devices that operate on short-range wireless network protocols based on the IEEE 802.15.1 family of standards (commonly referred to as Bluetooth®), the short-range wireless network transceiver 134 is a Bluetooth® transceiver that exchanges data between the additional device 104 and a master device. Other ad hoc networks using short-range wireless network protocols are also contemplated. For example, the LAN 106 may be an ad hoc network using devices that operate on short-range wireless network protocols based on the IEEE 802.15.4 family of standards (commonly referred to as Zigbee).

The location information collected by the components 126 can include one or more of the following: data collected by the GPS receiver 128, data collected by the accelerometer 130, a list of Service Set Identifiers (SSIDs) of wireless networks detected by the wireless network transceiver 132 as well as the quality of reception of the detected wireless networks (this is particularly suitable when the LAN 106 is a Wi-Fi LAN), a list of Bluetooth® device names detected by the short-range wireless network transceiver 134 as well as the quality of reception of the detected devices, a list of MAC or IP addresses in frames or packets received by the wireless network transceiver 132 or the short-range wireless network transceiver 134, images (i.e., image data) captured by the imaging device 138, and a list of cellular base transceiver station (BTS) identifiers (each associated with a respective BTS) detected by the cellular network transceiver 136 as well as the quality of reception of the BTSs associated with the detected BTS identifiers.

Preferably, each type of location information has an associated timestamp that indicates a time at which the location information was collected (i.e., obtained).

The location information is used in order to determine the geographic location of the additional device 104. In certain embodiments, the location is determined directly, for example via data collected by the GPS receiver 128 (which inherently includes location data). In other embodiments, the location is determined indirectly based on the data collected by one or more of the components 126, for example by determining the proximity of the additional device 104 to one or more Bluetooth® devices, one or more wireless LAN access points, one more cellular BTSs (associated with respective one or more detected BTS identifiers), or a combination thereof. For example, the additional device 104 could send information reporting that on a given date and time, the additional device 104 was able to receive from three BTSs (having BTS identifiers: BTS-A, BTS-B, BTS-C) with received signals strength of −50 dB, −90 dB and −120 dB, respectively. The additional device 104 could also report that at the same given date and time the additional device 104 was in proximity to a Bluetooth® device whose name was "Joel". Using the location information and the known locations of the BTSs and the Bluetooth® device, the location of the additional device 104 can be determined. Similarly, data reported by the accelerometer 130 in conjunction with a previously known location could be used to determine the location of the additional device 104, for example through the use of dead reckoning algorithms. The determination of the location of the additional device 104 may be performed by the additional device 104 itself, or alternatively, the additional device 104 could send the collected location information to a remote server (connected to the WAN 110) configured to determine the location based on the location information received from the additional device 104.

The reporter module 124 is configured to generate a set of log records (i.e., data entries or data objects) having data corresponding to location information (i.e., location data), network information (i.e., network data) associated with the additional device 104, device identification information (i.e., device ID data), and timestamp information (i.e., timestamp data). The set of log records forms a "log".

In certain preferred but non-limiting embodiments, the logs include location log records having location data that includes location information of the additional device 104, network log records having network data that includes network information associated with the additional device 104, device identifier (ID) data that includes a unique identifier that identifies the additional device 104, and timestamp data that includes a timestamp for each of the log network records and for each of the location log records. The geographical location of the additional device 104, that is determined based on the location information, may also be included as part of the location data.

In certain cases, the log records of the log are stored in a single log file. However, in other cases the log records of the log can be stored in separate log files. For example, the reporter module may generate one log file having log records that contain network data, and generate another log file having log records containing location data. Each generated log file preferably also includes device ID data that uniquely identifies the additional device 104. That way, if the reporter module generates multiple log files, each log file is tied to (i.e., associated with) the additional device 104.

The reporter module 124 can be implemented as a hardware module or software module, and includes software, software routines, code, code segments and the like, embodied, for example, in computer components, modules and the like, that are installed on the additional device 104. For example, the reporter module 124 performs actions when instructed by the CPU 118.

In one non-limiting example implementation, the additional device 104 is a mobile device running the Android operating system, and the reporter module 124 is implemented as a mobile application downloaded and installed on the additional device 104 from an application store such as Google Play. In another non-limiting example implementation, the reporter module 124 is implemented using a scripting language such as JavaScript and which is executed in a web browser of the additional device 104 when the additional device 104 accesses a web page.

In certain embodiments, the reporter module 124 is configured to periodically collect location related information or location data from the various components 126. The reporter module 124 can then optionally use the collected location information to determine the current geographic location of the additional device 104 (by using, for example, the methods described above).

In certain embodiments, the network information associated with the additional device 104 includes addresses with which the additional device 104 is associated. In general, the addresses can include addresses (e.g., IP addresses, MAC addresses) of the additional device 104, as well as addresses of the router 108. In certain embodiments, the reporter module 124 generates network data (i.e., network log records) that includes network information associated with the additional device 104 in the form of addresses associated with the additional device 104 by determining one or more addresses associated with the additional device 104 on the LAN-side of the router 108. For example, the reporter module 124 can determine the one or more addresses associated with the additional device 104 by using well-known application program interfaces (APIs) to determine any address, such as an IPv4 address, IPv6 address or a MAC address that the additional device 104 is configured with, such as the LAN-side IP address 192.168.1.104. The reporter module 124 is also preferably configured to communicate with a remote server, and receive from the remote server the IP address associated with the additional device 104 as perceived by the address server. Thus, for example, as illustrated in FIG. 1, the additional device 104 could communicate with a remote address server 116 connected to the WAN 110, and request that the address server 116 provide the reporter module 124 the addresses with which the additional device 104 is associated. From the perspective of the address server 116, the address server 116 sees the communication (i.e., the address request) as arriving from a WAN address (e.g., the address 198.51.100.80 of the WAN 110). In response to the address request from the reporter module 124, the address server 116 would indicate that the additional device 104 is associated with the WAN address (198.51.100.80). Accordingly, by determining an address (or addresses) associated with the additional device 104 on the LAN-side of the router 108 via well-known APIs, and by determining an address associated with the additional device 104 on the WAN-side of the router 108 via the address server 116, the reporter module 124 is able to determine, for example, that the addresses 192.168.1.104 (LAN-side) and 198.51.100.80 (WAN-side) are associated with the additional device 104. Thus, the network information associated with the additional device 104 in the network data of the log generated by the reporter module 124 can include both LAN-side and WAN-side addresses.

Figure 3:
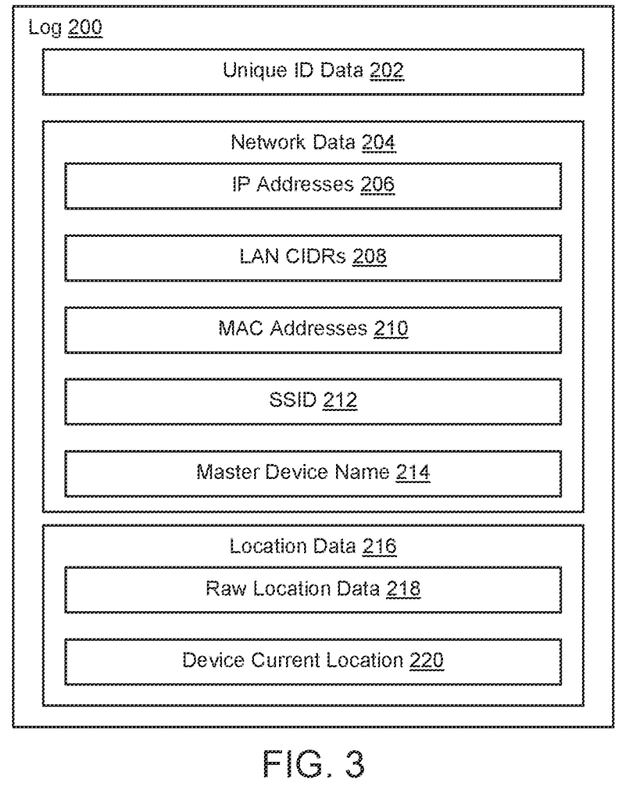
FIG. 3 is a diagram illustrating a non-limiting example of a log generated by the additional electronic devices.

With continued reference to FIGS. 1 and 2, refer now to FIG. 3, a diagram illustrating an example log 200 and the various log records (generated by the reporter module 124 of an additional device 104) that can be included in the log 200. In the present example, all of the log records generated by the reporter module 124 are contained in a single log 200 (i.e., single log file), however as discussed, the log records can be separately contained in multiple log files. The log 200 includes four main types of data (log records), namely data that separately contain device information, network information, location information, and time information.

The device information is contained in unique identifier (ID) data 202. The unique ID data 202 is a log record that is generated, by the reporter module 124, that uniquely identifies the additional device 104 on which the reporter module 124 is installed. In this way, the log record (and in this particular example the log 200) is linked to (i.e., associated with, tied to) a particular additional device that is uniquely identifiable.

The network information is contained in network data 204, which includes various log records corresponding to various types of network information associated with the additional device 104. The various types of network information include, for example, addresses associated with the additional device 104, and information related to the LAN 106 to which the additional device 104 is connected. As discussed above, the addresses associated with the additional device 104 can include the LAN-side IP address (e.g., 192.168.1.104) of the additional device 104 that is allocated from the LAN 106, the WAN-side IP address (e.g., 198.51.100.80) of the additional device 104 that is allocated from the WAN 110, and the MAC address of the additional device 104.

The information related to the LAN 106 to which the additional device 104 is connected can include, for example, the IP address (e.g., 192.168.1.108) of the router 108, a list of LAN CIDRs (e.g., 192.168.0.0/16), a list of MAC addresses of devices connected to the LAN, the SSID of the LAN (if the LAN is a wireless LAN that operates on Wi-Fi protocols), and a Bluetooth® master device name if the LAN is a Bluetooth® piconet).

Accordingly, the network data 204 can include: 1) IP address 206 log records that contains a list of the IP addresses (e.g., 192.168.1.104, 198.51.100.80) that are associated with the additional device 104, 2) MAC address 210 log records that contains a list of the MAC addresses of devices connected to the LAN 106 (including the MAC address of the additional device 104 and the MAC address of the target device 102), 3) LAN CIDR 208 log records that contains a list of the LAN CIDRs, 4) SSID 212 log records that lists the SSID of the LAN 106 (if the LAN is a wireless LAN that operates on Wi-Fi protocols), and 5) master device name 214 log records that lists the Bluetooth® master device name (if the LAN 106 is a Bluetooth® piconet).

The location information is contained in location data 216, which includes raw location data 218 log records that contain the various location data collected from the components 126. The location data 216 may further include device current location 220 log records that contains the current geographic location of the additional device 104 determined by the reporter module 124 based on the collected location information from the components 126.

Each of the log records preferably has an associated timestamp that indicates the time at which the log record was generated (i.e., created). For example, if network data 204 has in the IP address 206 log record the WAN-side IP address 198.51.100.80, then the log record containing the IP address 198.51.100.80 would have an associated timestamp indicating when the IP address 206 log record was created. This timestamp is also indicative of when the particular address was used by the additional device 104.

The reporter module 124 is configured to send the generated log records to a log server 112 that is connected to the WAN 110. In certain embodiments, the log records generated at the additional device 104 (by the reporter module 124) are sent to the log server 112 as a single log file. In other embodiments, the log records generated by the reporter module 124 are sent to the log server 112 as separate log files. The log server 112 receives the log file (or files) from the additional device 104 and preferably stores the log file(s).

Figure 4:
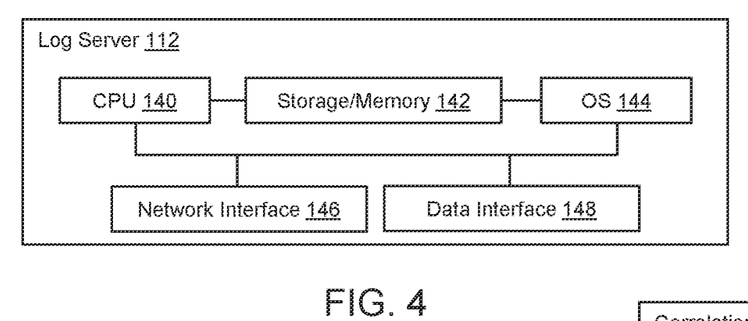
FIG. 4 is a block diagram of the architecture of a log server, connected to a second network in the form of a wide area network, that receives logs generated by the additional electronic devices.

FIG. 4 shows a block diagram of an exemplary log server 112 according to certain embodiments of the present disclosure. In the illustrated example, the log server 112 includes a CPU 140, a storage/memory 142, an OS 144, a network interface 146, and a data interface 148, all connected or linked to each other (electronically and/or data), either directly or indirectly. The CPU 140 is formed of one or more processors, including microprocessors, for performing the functions of the log server 112. The processors are, for example, conventional processors, such as those used in servers, computers, and other computerized devices. For example, the processors may include x86 Processors from AMD and Intel, Xeon® and Pentium® processors from Intel, as well as any combinations thereof.

The storage/memory 142 is any conventional storage media, which although shown as a single component for representative purposes, may be multiple components. The storage/memory 142 preferably stores the logs received from the additional device 104 (and other additional devices similar to the additional device 104). The storage/memory 142 may also store machine executable instructions, associated with the operation of the log server 112, for execution by the CPU 140.

The OS 144 includes any of the conventional computer operating systems, such as those available from Microsoft of Redmond Wash., commercially available as Windows® OS, such as Windows® XP, Windows® 7, MAC OS from Apple of Cupertino, Calif., or Linux.

The network interface 146 is a physical, virtual, or logical data link for communication (e.g., exchanging data) with the WAN 110. For example, logs (in the form of, for example, data packets) generated and sent by the additional devices 104 are received by the log server 112 (via the WAN 110) through the network interface 146.

The data interface 148 is a physical, virtual, or logical data link for providing data communication between the log server 112 and other WAN-side components of the system. The data interface 148 can be, in a simple form, a data bus providing data communication between the log server 112 and such components.

The logs received (and optionally stored) by the log server 112 are analyzed by a correlation engine 114. The correlation engine 114 is configured to communicate with the log server 112 (via the data interface 148) so as to receive logs from the log server 112, and is further configured to analyze the received logs together with received input associated with the target device 102.

Figure 5:
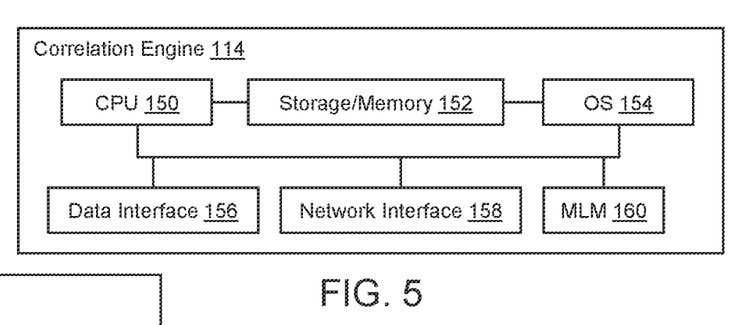
FIG. 5 is a block diagram of the architecture of a correlation engine that receives input associated with the target electronic device and analyzes the logs received by the log server to identify and classify the location of the target electronic device.

FIG. 5 shows a block diagram of an exemplary correlation engine 114 according to certain embodiments of the present disclosure. In the illustrated example, the correlation engine 114 includes a CPU 150, a storage/memory 152, an OS 154, a data interface 156, a network interface 158, and preferably a machine learning model 160, all connected or linked to each other (electronically and/or data), either directly or indirectly. The CPU 150 is formed of one or more processors, including microprocessors, for performing the functions of the correlation engine 114. The processors are, for example, conventional processors, such as those used in servers, computers, and other computerized devices. For example, the processors may include x86 Processors from AMD and Intel, Xeon® and Pentium® processors from Intel, as well as any combinations thereof.

The storage/memory 152 is any conventional storage media, which although shown as a single component for representative purposes, may be multiple components. The storage/memory 152 stores machine executable instructions, associated with the operation of the correlation engine 114, for execution by the CPU 150.

The OS 154 includes any of the conventional computer operating systems, such as those available from Microsoft of Redmond Wash., commercially available as Windows® OS, such as Windows® XP, Windows® 7, MAC OS from Apple of Cupertino, Calif., or Linux.

The data interface 156 is a physical, virtual, or logical data link for providing data communication between the data interface 148 of the log server 112 and the correlation engine 114. In embodiments in which the log server 112 and the correlation engine 114 are co-located, a data bus may be used to implement the data communication connection between the log server 112 and the correlation engine 114 effectuated by the data interfaces 148, 156. In other embodiments, the data interfaces 148, 156 may be implemented as network interfaces which provide network communication (e.g., via the WAN 110) between the log server 112 and the correlation engine 114. Alternatively, the network interface 158, implemented as a physical, virtual, or logical data link, may be used for communicating with the log server 112 via the network interface 146 through the WAN 110.

In operation, the correlation engine 114 receives logs from the log server 112 (via one of the interfaces 156, 158) and input associated with the target device 102 (via, for example, the network interface 158). The input associated with the target device 102 is typically received in response to the target device 102 interacting with the LAN 106, for example in response to the target device 102 connecting to the LAN 106 and/or sending or receiving packets to or from the WAN 110 via the LAN 106. The input includes network information (contained in network data) associated with the target device 102, including one or more of: 1) an address associated with the target device 102, which may include the LAN-side IP address of the router 108 (e.g., 192.168.1.108) and/or the WAN-side IP address of the router 108 (e.g., 198.51.100.80), 2) the IP address of the target device 102 (e.g., 192.168.1.102), 3) the MAC address of the target device 102, the SSID of a wireless network to which the target device 102 is connected, or 4) a Bluetooth® master device name of a piconet in which the target device 102 is a member.

The network information associated with the target device 102 can be gleaned from various sources, for example network elements or network devices connected to the LAN 106, including, for example, a router, bridge, switch, firewall or sniffer (network analyzer) that receives traffic (e.g., packets) from the target device 102 or destined to the target device 102. In the non-limiting example environment 100, the network information associated with the target device 102 is gleaned by the router 108. However, it should be noted that any one of the aforementioned network elements, when connected to the LAN 106, can be used to report the network information associated with the target device 102.

The input may also include a time interval associated with the received network data associated with the target device 102. The time interval is representative of the period of time during which traffic is exchanged between the target device 102 and the WAN 110, for example the period of time during which the router 108 forwards traffic that originated from or is destined to the target device 102 between the LAN 106 and the WAN 110. The time interval is generally defined by a start timestamp (signifying the beginning of the time interval) and an end timestamp (signifying the end of the time interval).

The correlation engine 114 (i.e., the CPU 150) analyzes the logs (either by directly scanning the logs stored in the log server 112, or by receiving the logs from the log server 112 and storing the logs in local memory (e.g., storage/memory 152) and then scanning the received stored logs) to identify log records that match the input network information associated with the target device 102. In particular, the correlation engine 114 scans the logs so as to analyze the network log records to identify network information (network data) in the network log records that match the network information (network data) associated with the target device 102. Network information in a network log record is considered to "match" the network information associated with the target device 102 if: 1) an address associated with the target device 102 is listed in the log record as an address associated with the additional device 104, 2) the IP address of the target device 102 is listed in the log record as part of one of the LAN CIDRs, 3) the MAC address of the target device 102 is listed in the log record as one of the MAC addresses of devices connected to the LAN 106, 4) the SSID of the wireless network to which the target device 102 is connected is identified in the log record, 5) the Bluetooth® master device name of a piconet in which the target device 102 is a member is identified in the log record.

The quality of the above "matches" may be strengthened if the timestamp associated with the log record falls within the input time interval (i.e., between the start timestamp and the end timestamp). In addition, the quality of a "match" may be weakened or altogether negated if the timestamp associated with the log record falls outside of the input time interval.

It is noted that in certain instances, the input network information associated with the target device 102 may include more than one type of network information, e.g., the input network information may include, simultaneously, one or more IP addresses associated with the target device 102, the MAC address of the target device 102, and the SSID of a wireless LAN to which the target device 102 is connected. In such circumstances, the matches may be found between the network information in the received logs and each type of network information.

Thus, the correlation engine 114 produces a set of logs (that includes at least one log) having the identified network information that matches the input network information associated with the target device 102, optionally together with the time interval associated with the received network information associated with the target device 102. The produced set of logs is referred to as "matching logs".

The correlation engine 114 then determines a (geographic) location associated with the target device 102 based on the location information in the matching logs. In particular, the correlation engine 114 may scan the produced matching logs to analyze and extract the location information in the location data log records of the matching logs, in order to determine the location associated with the target device 102. The determined location associated with the target device 102 may be a precise geographic location of the target device 102 or may be an approximate geographic location of the target device 102 (depending, for example, on the geographic coverage area of the LAN 106).

In certain embodiments, the correlation engine 114 processes the raw location data in the log records to determine the location of the additional device 104 and thereby determine the location associated with the target device 102. In other embodiments, the correlation engine 114 retrieves the device current location log record that contains the current geographic location of the additional device 104 (at the time when the log record was generated), and concludes that the location of the target device 102 is precisely or approximately the same as the location indicated in the device current location log record.

As mentioned, in many cases there are a plurality of additional devices 104 connected to the LAN 106, each being configured with a reporter module 124 to generate and send logs to the log server 112. Accordingly, the log server 112 is configured to receive logs from one or more additional devices 104, and in most practical situations a plurality of such devices 104, for example three or more such devices, and in certain situations up to ten such devices.

It follows that the correlation engine 114 is configured to scan and analyze the logs received by the log server 112 from all of the aforementioned additional devices 104. Since the correlation engine 114 scans logs originated from multiple additional devices 104, situations may arise in which the correlation engine 114 determines more than one location for the target device 102, due to the location information in the logs generated by the various additional devices 104 indicating various locations for the additional devices 104. In such situations, the correlation engine 114 preferably performs logical operations to filter out unlikely locations. In certain non-limiting implementations, the logical operations include performing a simple majority logic operation by determining the number of additional devices 104 determined to be in each of the locations, and determining that the location associated with the target device 102 is the location having the largest number of the additional devices 104 associated with that location. For example, consider a scenario in which after scanning and analyzing logs generated from multiple additional devices 104, the correlation engine 114 produces a set of matching logs that contains five logs, where each respective one of the five logs is generated by a unique respective additional device 104 (i.e., five additional devices 104). If one of logs (generated by a first of the additional devices 104) contains location information that indicates that the location (at the time the log was generated) of the first additional device 104 is location X, and the other four logs (respectively generated by the other four additional devices 104) each contain location information that indicates that the location (at the times the four logs were generated) of the four additional devices 104 is location Y, then the correlation engine 114 determines that location Y is associated with the target device 102.

In other non-limiting implementations, the correlation engine 114 uses a preconfigured list of areas of interest (stored, for example, in the storage/memory 152) and filters out any determined locations that are not in the list of areas of interest. In such implementations, the correlation engine 114 can potentially determine that more than one location is associated with the target device 102. For example, the correlation engine 114 may output a list of locations that consists of all locations not filtered out (i.e., all locations that are in the list of areas of interest). In such situations, the correlation engine 114 can compute an average location by averaging over all of the locations that are in the list of areas of interest, and then output the computed average location as the location determined to be associated with the target device 102. In certain non-limiting implementations, the correlation engine 114 additionally performs majority logic operations (for example, as described above) to further filter out locations.

In certain preferred embodiments, the correlation engine 114 is additionally configured to classify the location determined to be associated with the target device 102 according to a location type. In particular, the correlation engine 114 is configured to analyze the matching logs to detect patterns of activities within the locations that are indicated by the location information in the matching logs. The correlation engine 114 preferably detects such patterns based on various metrics. The following metrics have been found to be particularly suitable for detecting patterns in order to classify locations: 1) the number of unique additional devices 104 that generated a log in the set of matching logs, 2) the duration of stay of each of the unique additional devices 104 that generated a log in the set of matching logs, 3) the time of day at which each of the logs in the set of matching logs was generated (determined by the timestamp log records in the log), 4) the correlation between the time of arrival of different additional devices 104 to the location indicated by the location information in the matching logs (determined by the timestamp log records in the log), and 5) the correlation between the time of departure of different additional devices 104 from the location indicated by the location information in the matching logs (determined by the timestamp log records in the log).

For example, consider a location such as a train station. The set of matching logs are likely to reflect a pattern in which multiple additional devices 104 arrive and depart the location at roughly the same time, such as when the devices arrive and leave on the same train. In such a case, the matching logs should show a relatively high correlation in the arrival time of multiple additional devices 104 as well as a relatively high correlation in the departure time of multiple additional devices 104. The arrival times and departure times can be gleaned from timestamp log records in the matching logs, which are generated, for example, when the additional devices 104 connect to the LAN 106 and disconnect from the LAN 106.

As another example, consider a restaurant. The set of matching logs are likely to reflect a pattern of higher activity based on the time of day, for example, around the times when the restaurant serves lunch and dinner.

As yet another example, consider a coffee stand or coffee cart, where the set of matching logs are likely to reflect a pattern of activity in which the duration of stay of each of the additional devices 104 is relatively short, e.g., on average less than five minutes.

The correlation engine 114 preferably performs location classification using the machine learning model (MLM) 160 (FIG. 5), which can be implemented as a software module or hardware module. In one non-limiting implementation, the MLM 160 is implemented as a neural network that is trained to classify locations and receives as input one or more of the matching logs and one or more of the above-mentioned metrics. During the training process of the neural network, the input to the neural network preferably also includes a label indicating the ground truth classification of the input. Ground truth labels can include, but are not limited to, one or more public transportation stations (e.g., bus stations, train stations, ferry stations, and the like), one or more restaurants, one or more shops (including indoor shops and outdoor stands, e.g., bookstores, coffee shops, coffee stands, etc.), one or more private residences (e.g., private homes, apartments, etc.), one or more educational facilities (e.g., primary schools, high schools, universities, etc.), one or more medical facilities (e.g., hospitals, medical clinics, etc.).

In operation, the correlation engine 114 provides the determined location associated with the target device 102 to the MLM 160, which uses the matching logs together with the pre-computed trained model (e.g., the trained model of the neural network) to classify the location according to a location type.

Figure 6:
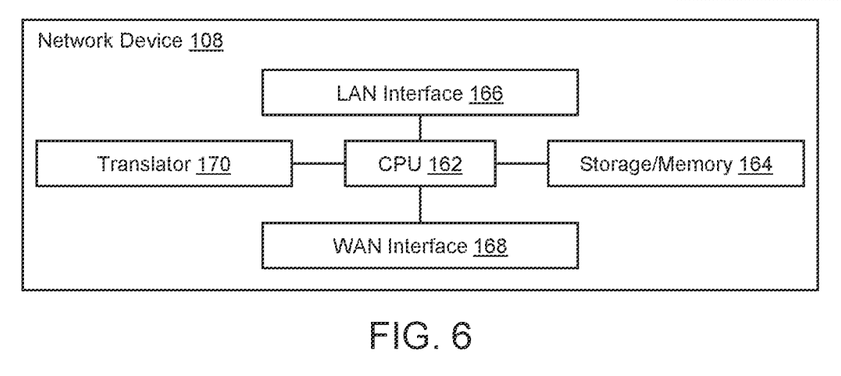
FIG. 6 is a block diagram of the architecture of a network device that provides a connection between the local area network and the wide area network.

FIG. 6 shows a block diagram of an exemplary network element (e.g., router) 108 according to certain embodiments of the present disclosure. In the illustrated example, the router 108 includes a CPU 162, a storage/memory 164, a LAN interface 166 for interfacing with the LAN 106, a WAN interface 168 for interfacing with the WAN 168, and a translator 170, all connected or linked to each other (electronically and/or data), either directly or indirectly. The router 108 may also include an OS (not shown). The CPU 162 is formed of one or more processors, including microprocessors, for performing the functions of the router 108. The processors are, for example, conventional processors, such as those used in servers, computers, and other computerized devices. For example, the processors may include x86 Processors from AMD and Intel, Xeon® and Pentium® processors from Intel, as well as any combinations thereof.

The storage/memory 164 is any conventional storage media, which although shown as a single component for representative purposes, may be multiple components. The storage/memory 164 stores machine executable instructions, associated with the operation of the router 108, for execution by the CPU 162.

The LAN interface 166 is a physical, virtual, or logical data link for communication (e.g., exchanging data) with the LAN 106. The WAN interface 168 is a physical, virtual, or logical data link for communication (e.g., exchanging data) with the WAN 110. For example, traffic (in the form of, for example, data packets) originating from devices connected to the LAN 106 (e.g., the additional device 104, the target device 102, etc.) and destined for the WAN 110 are received by the router 108 at the LAN interface 166 and then sent to the WAN 110 via the WAN interface 168. Similarly, traffic from the WAN 110 that is destined for a device connected to the LAN 106 is received by the router 108 at the WAN interface 168 and then sent to the destined device via the LAN interface 166.

The translator 170 is a module (e.g., a software module or a hardware module) that is configured to perform source address translation for traffic that is exchanged between the LAN 106 and the WAN 110. For example, the translator 170 may be configured to perform NAT such that the source address of packets originating from the LAN 106 and forwarded to the WAN 110 is translated by the translator 170 to its own WAN address (e.g., 198.51.1.80) or to some other WAN address, and the destination addresses of returning packets (i.e., from the WAN 110 to the LAN 106) are translated by the translator 170 from the WAN address to the LAN address. As discussed, the translator 170 could also be configured to use other network protocols such as, for example, GRE, VXLAN or IPsec, which could encapsulate packets from the LAN 106 as they are forwarded to the WAN 110.

Figure 7:
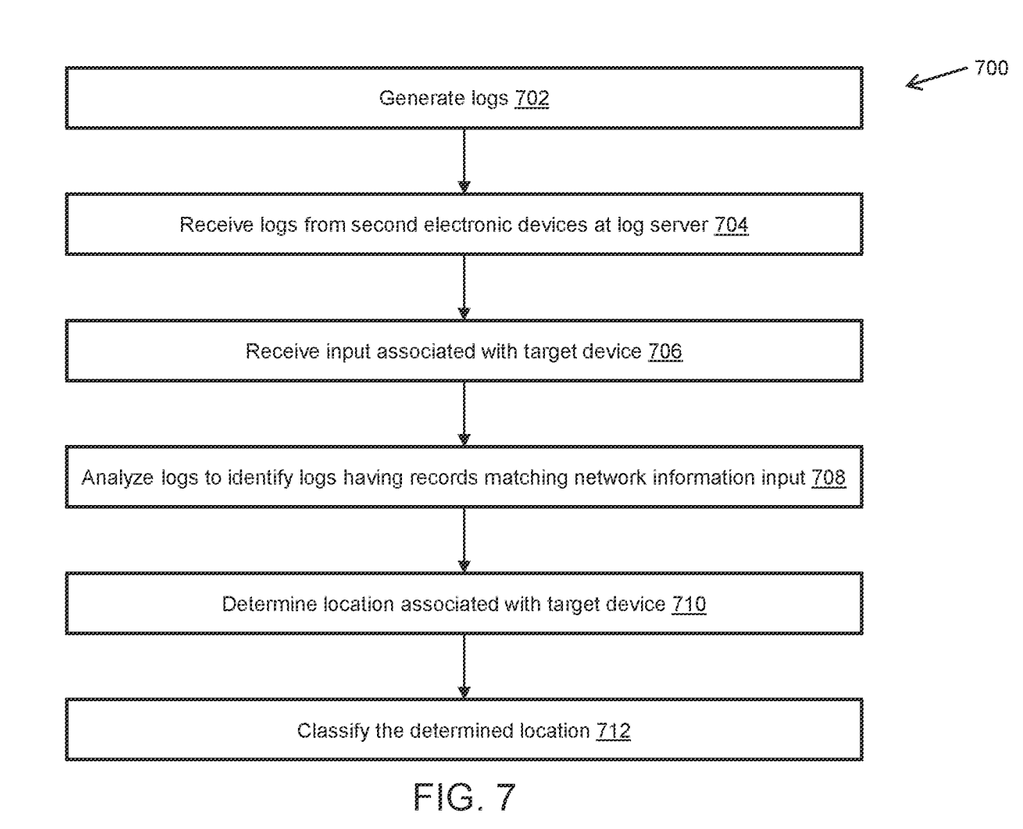
FIG. 7 is a flow diagram illustrating a process for identifying and classifying the location of the target electronic device.

Attention is now directed to FIG. 7 which shows a flow diagram detailing a computer-implemented process 700 in accordance with embodiments of the disclosed subject matter. This computer-implemented process includes an algorithm for, among other things, determining a location associated with a target electronic device 102 and classifying the determined location according to a location type. Reference is also made to the elements shown in FIGS. 1-6. The process and sub-processes of FIG. 7 are computerized processes performed by various components associated with one or more additional electronic devices 104, the log server 112 and associated components, and the correlation engine 114 and associated components. Some of the sub-processes may also be performed by the router 108 and associated components, as well as the address server 116 and associated components. The aforementioned processes and sub-processes are for example, performed automatically, but can be, for example, performed manually, and are performed, for example, in real time.

At step 702, the process 700 starts, where the reporter modules 124 of one or more corresponding additional devices 104 generate logs (having log records). The logs, and in particular the network log records, are typically generated in response to the additional devices 104 interacting with the LAN 106, for example in response to the additional devices 104 connecting to the LAN 106 and/or, in response to the additional devices 104 sending traffic to the WAN 110 via the LAN 106 and the router 108, and/or in response to the additional devices 104 receiving traffic from the WAN 110 via the router 108 and the LAN 106. As discussed above, the log generated by each additional device 104 contains multiple log records (e.g., network log records, location log records, etc.), which can be contained in a single log file or multiple log files.

Also as discussed above, for each of the additional devices 104 some of the network log records may be generated by the reporter module 124 in response to the reporter module 124 querying the address server 116 to provide IP address information. Furthermore, as discussed above, for each of the additional devices 104 the location log records are generated by the reporter module 124 in response to the reporter module 124 collecting location related information or location data from one or more of the components 126 of the additional device 104.

The process 700 moves to step 704, where the generated logs are received at the log server 112 (in response to the reporter modules 124 sending the logs to the log server 112 via the LAN 106, router 108, WAN 110 route), and in certain embodiments received at the correlation engine 114. Each of the reporter modules 124 may send the log records to the log server 112 as separate log files. For example, the reporter module 124 of one of the additional devices 104 may send network log records as part of one or more first log files, and may send location log records as part of one or more second log files. The reporter module 124 of another one of the additional devices 104 may send all of the network log records and all of the location log records as part of a single log file.

At step 706, the correlation engine 114 receives input, including network data (containing network information) associated with the target device 102. The network information is generated in response to traffic being exchanged between the target device 102 and the WAN 110. As discussed, the input preferably also includes a time interval representative of the period of time during which traffic is exchanged between the target device 102 and the WAN 110, for example the period of time during which the router 108 forwards traffic that originated from or is destined to the target device 102 between the LAN 106 and the WAN 110.

At step 708, the correlation engine 114 (i.e., the CPU 150) scans the logs received by the log server 112 to identify logs (i.e., "matching logs") having log records that match the input network information. As discussed, the correlation engine 114 may scan the logs stored at the log server 112, or may first receive the logs from the log server 112 to store the logs in local memory (e.g., storage/memory 152) and then scan the locally stored logs.

The process 700 then moves to step 710, where the correlation engine 114 (i.e., the CPU 150) determines the location associated with the target device 102 based on the location information in the matching logs. The process 700 preferably then moves to step 712, where the MLM 160 of the correlation engine 114 classifies the location determined at step 710 according to a location type. As discussed, the classification is preferably based on the network log records in the matching logs and the timestamps associated with the network log records.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for locating a first electronic device connected to a first network, the method comprising:
    receiving, via a second network linked to the first network, one or more logs generated at corresponding one or more second electronic devices that are different from the first electronic device and that are connectable to the first network, each log of the one or more logs having: i) network data that includes network information associated with a corresponding second electronic device of the one or more second electronic devices, and ii) location data that includes location information indicative of a location of the corresponding second electronic device;
    analyzing the network data of the received one or more logs to identify network information, associated with at least one of the one or more second electronic devices, in at least one of the one or more logs that matches received network information associated with the first electronic device; and
    determining a location associated with the first electronic device based on the location information, indicative of location of the at least one of the one or more second electronic devices, in the location data of the at least one of the one or more logs.

2. The method of claim 1, wherein for each log: the network data and the location data are contained in a single log file.

3. The method of claim 1, wherein for each log: the network data is contained in one or more first log files, and the location data is contained in one or more second log files separate from the one or more first log files.

4. The method of claim 1, wherein the receiving the one or more logs includes:
    storing the one or more logs at a server connected to the second network, and
    receiving the stored one or more logs at a correlation engine in data communication with the server.

5. The method of claim 1, wherein the first network is linked to the second network via a network element that provides a connection between the first and second networks, and wherein for each of the one or more logs, the network information includes at least one of: an internet protocol (IP) address of the network element allocated from the first network, or an IP address of the network element allocated from the second network.

6. The method of claim 1, wherein for each of the one or more logs, the network information includes at least one of: an internet protocol (IP) address of the corresponding second electronic device allocated by the first network, or an IP address allocated by the second network that is associated with the corresponding second electronic device.

7. The method of claim 1, wherein for each of the one or more logs, the network information includes at least one of: one or more addresses associated with the corresponding second electronic device, media access control addresses of electronic devices connected to the first network, classless inter-domain routing addresses of the first network, a Service Set Identifier of the first network, or a Bluetooth master device name.

8. The method of claim 1, wherein the received network information associated with the first electronic device includes at least one of: one or more addresses associated with the first electronic device, an internet protocol address of the first electronic device, a media access control address of the first electronic device, a Service Set Identifier of a network to which the first electronic device is connected, a Bluetooth master device name of a network in which the first electronic device is a member.

9. The method of claim 1, wherein for each of the one or more logs, the network data has one or more associated timestamps, and the method further comprising:
    receiving a time interval associated with the network information associated with the first electronic device,
    and wherein the analyzing the network data includes:
        inspecting the network data of the received one or more logs to identify network information that: i) matches the received network information associated with the first electronic device, and ii) in which at least one of the one or more timestamps, associated with the network data having the matching network information, falls within the time interval.

10. The method of claim 1, wherein for each of the one or more logs, the network data has one or more associated timestamps, and the method further comprising:
    analyzing the network data in the at least one of the one or more logs and the timestamps associated with the network data in the at least one of the one or more logs to classify the determined location according to a location type.

11. The method of claim 10, wherein the analyzing the network data in the at least one of the one or more logs and the timestamps associated with the network data in the at least one of the one or more logs includes detecting a pattern based on at least one of: i) a number of unique second electronic devices associated with the at least one of the one or more logs, ii) a duration of stay of each of the unique second electronic devices associated with the at least one of the one or more logs, iii) a time of day at which each of the at least one of the one or more logs was generated, iv) a correlation between a time of arrival of second electronic devices to one or more locations indicated by the location information in the location data of the at least one of the one or more logs, or v) a correlation between a time of departure of second electronic devices from one or more locations indicated by the location information in the location data of the at least one of the one or more logs.

12. The method of claim 10, wherein the location type is selected from the group consisting of: a public transportation station, a shop, a private residence, an educational facility, and a medical facility.

13. The method of claim 1, wherein for each of the one or more logs, the location data includes one or more of: data provided by a global positioning system receiver of the second electronic device, positioning data provided by one or more accelerometers of the second electronic device, one or more Service Set Identifiers of a wireless network detected by a wireless network transceiver of the second electronic device, one or more Bluetooth device names detected by a Bluetooth communication transceiver of the second electronic device, a list of media access control or internet protocol addresses in communication data received by a Bluetooth transceiver of the second electronic device, image data captured by an imaging device associated with the second electronic device, cellular base transceiver stations and associated signal strength provided by a cellular network transceiver of the second electronic device.

14. The method of claim 1, further comprising:
generating, by a reporter module installed on one or more second electronic devices connected to the first network, the one or more logs; and
sending, by the reporter module of each of the one or more second electronic devices, the generated log to a server connected to the second network.

15. The method of claim 1, wherein the at least one of the one or more second electronic devices is a mobile device, and wherein the first electronic device is a stationary device.

16. A system for locating a first electronic device connected to a first network, the system comprising:
a server linked to the first network via a second network and configured to receive, via the second network, one or more logs generated at corresponding one or more second electronic devices that are different from the first electronic device and that are connectable to the first network, each log of the one or more logs having: i) network data that includes network information associated with a corresponding second electronic device of the one or more second electronic devices, and ii) location data that includes location information indicative of a location of the corresponding second electronic device; and
a correlation engine including at least one processor in data communication with the server and configured to:
analyze the network data of the one or more logs received by the server to identify network information, associated with at least one of the one or more second electronic devices, in at least one of the one or more logs that matches received network information associated with the first electronic device, and
determine a location associated with the first electronic device based on the location information, indicative of location of the at least one of the one or more second electronic devices, in the location data of the at least one of the one or more logs.

17. The system of claim 16, wherein a connection between the first and second networks is provided by a network element, and wherein for each of the one or more logs, the network information includes at least one of: an internet protocol (IP) address of the network element allocated from the first network, or an IP address of the network element allocated from the second network.

18. The system of claim 16, wherein for each of the one or more logs, the network data has one or more associated timestamps, and wherein the correlation engine is further configured to: analyze the network data in the at least one of the one or more logs and the timestamps associated with the network data in the at least one of the one or more logs to detect patterns in the network data in the at least one of the one or more logs and the timestamps associated with the network data in the at least one of the one or more logs so as to classify the determined location according to a location type.

19. The system of claim 18, wherein the patterns are detected based on at least one of: i) a number of unique second electronic devices associated with the at least one of the one or more logs, ii) a duration of stay of each of the unique second electronic devices associated with the at least one of the one or more logs, iii) a time of day at which each of the at least one of the one or more logs was generated, iv) a correlation between a time of arrival of second electronic devices to one or more locations indicated by the location information in the location data of the at least one of the one or more logs, or v) a correlation between a time of departure of second electronic devices from one or more locations indicated by the location information in the location data of the at least one of the one or more logs.

20. The system of claim 18, wherein the location type is selected from the group consisting of: a public transportation station, a shop, a private residence, an educational facility, and a medical facility.

21. A method for locating a first electronic device connected to a first network, the method comprising:
receiving, via a second network linked to the first network, one or more sets of log records generated at corresponding one or more second electronic devices that are different from the first electronic device and that are connectable to the first network, each set of the one or more sets of log records having: i) at least one network log record containing network data associated with a corresponding second electronic device of the one or more second electronic devices, and ii) at least one location log record associated with the at least one network log record and containing location data indicative of a location of the corresponding second electronic device;
analyzing the received log records to identify network data, associated with at least one of the one or more second electronic devices, in at least one of the log records that matches received network data associated with the first electronic device; and
determining a location associated with the first electronic device based on the location data, indicative of location of the at least one of the one or more second electronic devices, in location log records associated with the at least one of the log records.

\* \* \* \* \*